(12) United States Patent
Larson

(10) Patent No.: US 7,752,625 B2
(45) Date of Patent: Jul. 6, 2010

(54) CACHING RESOURCES REQUESTED BY APPLICATIONS

(75) Inventor: Tait E. Larson, Menlo Park, CA (US)

(73) Assignee: International Business Machines Corporation, Armonk, NY (US)

( * ) Notice: Subject to any disclaimer, the term of this patent is extended or adjusted under 35 U.S.C. 154(b) by 1416 days.

(21) Appl. No.: 11/156,504

(22) Filed: Jun. 17, 2005

(65) Prior Publication Data

US 2007/0005887 A1    Jan. 4, 2007

(51) Int. Cl.
G06F 9/46 (2006.01)
G06F 13/00 (2006.01)

(52) U.S. Cl. .......... 718/104; 711/118
(58) Field of Classification Search .......... 711/134, 711/118; 709/104; 718/104, 100
See application file for complete search history.

(56) References Cited

U.S. PATENT DOCUMENTS

| | | | |
|---|---|---|---|
| 5,699,540 A | | 12/1997 | Vanka et al. |
| 6,128,623 A | * | 10/2000 | Mattis et al. ............ 707/103 R |
| 6,163,773 A | * | 12/2000 | Kishi ........................ 706/16 |
| 6,298,356 B1 | | 10/2001 | Jawahar et al. |
| 6,453,321 B1 | * | 9/2002 | Hill et al. ................ 707/103 Y |
| 6,542,967 B1 | * | 4/2003 | Major ....................... 711/134 |
| 6,553,461 B1 | | 4/2003 | Gupta et al. |
| 6,609,136 B2 | | 8/2003 | Bamford et al. |
| 6,675,261 B2 | * | 1/2004 | Shandony ................ 711/121 |
| 6,701,415 B1 | * | 3/2004 | Hendren, III ............ 711/138 |
| 6,877,066 B2 | * | 4/2005 | Benfield et al. .......... 711/118 |
| 2001/0029519 A1 | * | 10/2001 | Hallinan et al. .......... 709/104 |
| 2001/0034814 A1 | | 10/2001 | Rodenzweig |
| 2002/0078300 A1 | | 6/2002 | Dharap |
| 2003/0101320 A1 | | 5/2003 | Chauvel et al. |

OTHER PUBLICATIONS

Bea Systems, Inc., "Managing JDBC Connectivity", [online], 2001, [Retrieved on May 11, 2005], retrieved from the Internet at <URL: http://e-docs.bea.com/wls/docs61/adminguide/jdbc.html#jdbc011>.
Bea Systems, Inc., "Programming WebLogic JMS", [online], 2004, [Retrieved on May 11, 2005], retrieved from the Internet at <URL: http://e-docs.bea.com/wls/docs81/jms/fund.html>.

* cited by examiner

*Primary Examiner*—Meng-Ai An
*Assistant Examiner*—Tammy Lee
(74) *Attorney, Agent, or Firm*—David Victor; Konrad Raynes & Victor LLP

(57) ABSTRACT

Provided are a method, system, and program for caching resources requested by applications. Resources requested by applications are cached, wherein the applications use the resources to access services. A capability set of at least one capability is associated with each resource group. A resource group includes at least one resource for accessing one service and the capability set associated with one resource group includes at least one capability for the resources in the resource group. A request for cached resources having a requested at least one capability is received from one of the applications. A determination is made of the one resource group associated with one capability set satisfying the requested at least one capability.

27 Claims, 5 Drawing Sheets

Resource Table Entry

CACHING RESOURCES REQUESTED BY APPLICATIONS

BACKGROUND OF THE INVENTION

1. Field of the Invention

Provided are a method, system, and program for caching resources requested by applications.

2. Description of the Related Art

In a computing environment, applications may access external services by instantiating resources, such as objects, that are used to access and perform operations related to the external services. Such resources include session objects, connection objects to provide a connection to the service, and other objects related to the use of the service, such as queues, managers, etc. Resources also include other types of services, functions objects, and links to external data. For example, to access a Java Messaging Service (JMS), the application instantiates a connection and session objects, as well as message queues and message manager objects. (Java is a trademark of Sun Microsystems, Inc.). Similarly, to access a database in a Java computing environment, applications may instantiate a connection and other objects for a Java Database Connectivity (JDBC) service that provides access to external databases.

A cache may be used to store resources instantiated by an application. A developer may create a cache to store a particular type of resource, such that multiple caches are created for the different resources. For instance, a developer may use one cache for identical database connection objects for a JDBC service and another cache for identical session and connection objects for a JMS service. This technique requires different caches for different types of resources. If the applications are instantiating different types of resources that are tightly coupled, then the applications must keep track of how resources in different caches are related, which may be difficult to code. Further, maintaining different caches for the different resource types may result in the allocation of an entire cache to a resource that is not frequently used.

Operating system resources may be stored in one cache, such that distinct resources are mapped to specific locations in a virtual memory page. In this case the cache consists of distinct resources that map to specific locations in the cache.

SUMMARY

Provided are a method, system, and program for caching resources requested by applications. Resources requested by applications are cached, wherein the applications use the resources to access services. A capability set of at least one capability is associated with each resource group. A resource group includes at least one resource for accessing one service and the capability set associated with one resource group includes at least one capability for the resources in the resource group. A request for cached resources having at least one capability is received from one of the applications. A determination is made of one resource group associated with one capability set satisfying the requested at least one capability.

DETAILED DESCRIPTION

Figure 1:
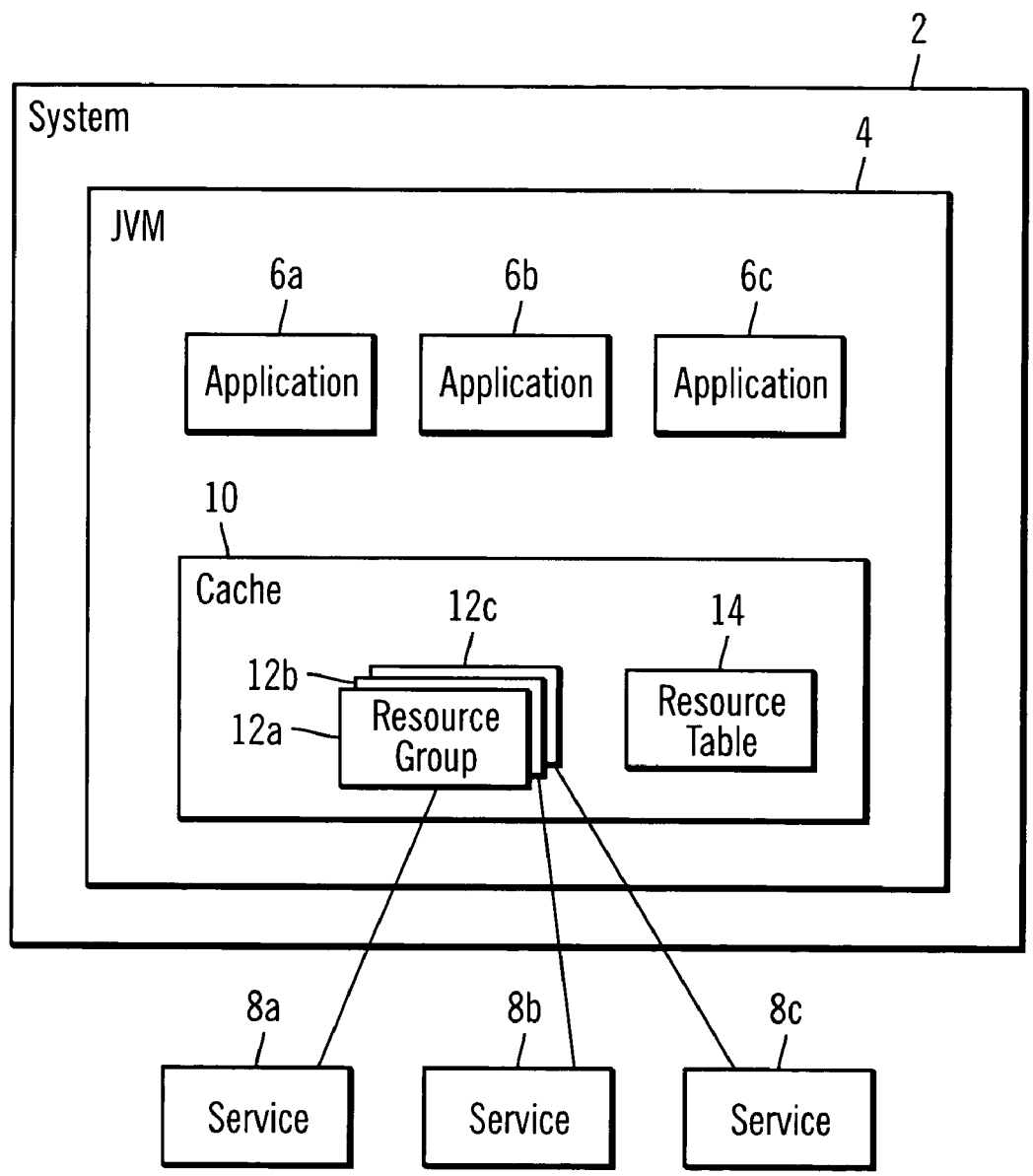
FIG. 1 illustrates an embodiment of a computing environment in which an application accesses services.

FIG. 1 illustrates a system 2, comprised of one or more processing complexes, machines, etc, implementing a Java Virtual Machine (JVM) 4, or other runtime environment, in which applications 6a, 6b, 6c execute. The applications 6a, 6b, 6c may establish a session with services 8a, 8b, 8c, which may be external to the system 2. The services 8a, 8b, 8c may provide a service or function to the applications 6a, 6b, 6c. For instance, the services 8a, 8b, 8c may comprise a messaging service to enable the applications 6a, 6b, 6c to send messages to a message broker to deliver to a target application or service, a storage service to store data in a storage device, database services, web services, etc. The applications 6a, 6b, 6c may call methods of a cache class to store the resources the applications 6a, 6b, 6c instantiate to access or use one service 8a, 8b, 8c in a cache 10 implemented in the system 2. Resources comprise services, functions objects, and links to external data. The cache 10 may be implemented in one or more volatile or non-volatile memory devices, or a storage device used by the system 2. The cached resources are arranged in resource groups 12a, 12b, 12c, wherein each resource group includes one primary resource used to access the service 8a, 8b, 8c and zero or more secondary resources used as part of accessing the service 8a, 8b, 8c. A resource table 14 provides a capability set for each resource group indicating the capabilities of the resources included in the resource group.

The primary resource may comprise a session object indicating a service session and the secondary resources may comprise objects relevant to the service, such as a connection object representing an open communication channel between one application 6a, 6b, 6c and the service 8a, 8b, 8c and other resources used to access and use the service 8a, 8b, 8c functions. For instance, if the service 8a, 8b, 8c comprises a messaging service, then the primary resource may comprise the session object providing a serial order of messages produced and consumed for the messaging service, such as a JMS message broker, and the secondary objects may include message related resources, such as message queues, a queue manager, etc. In additional embodiments, the primary and secondary resources may be part of a hierarchical arrangement of resources of arbitrary depth.

Figure 2:
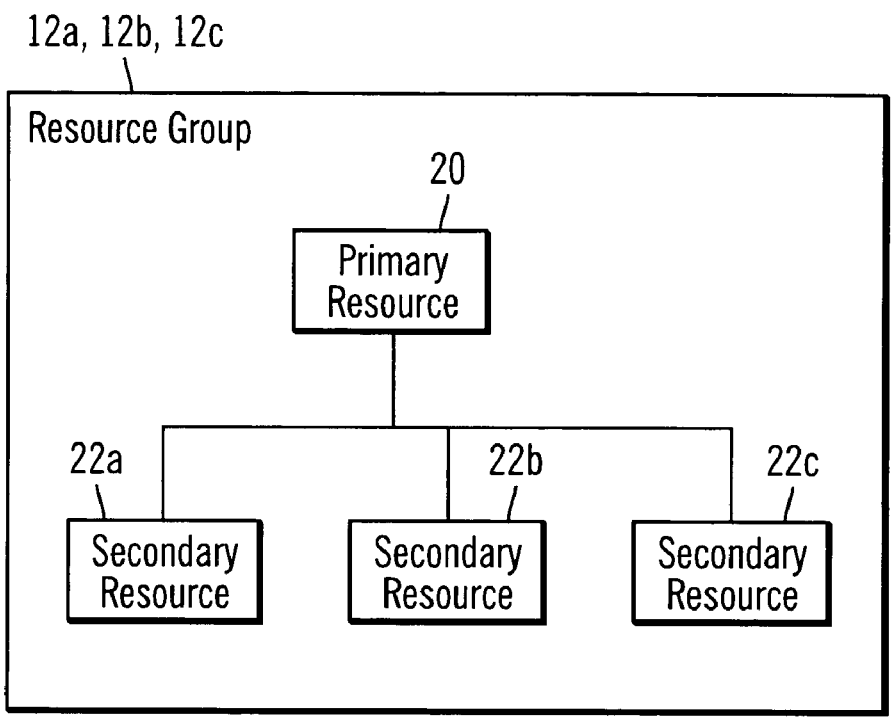
FIG. 2 illustrates an embodiment of a resource group.

FIG. 2 illustrates an embodiment of a resource group 12a, 12b, 12c including a primary resource 20 for a service and multiple secondary resources 22a, 22b, 22c used as part of accessing and using the service 8a, 8b, 8c. As part of maintaining the resource groups 12a, 12b, 12d, the cache 10 maintains an association of a primary resource 20 and each of the secondary resources 22a, 22b, 22c for the service 8a, 8b, 8c, as well as any additional levels of resources, e.g., tertiary or at further lower levels in a hierarchical arrangement of resources. This association may comprise a data structure indicating the members of each resource group 12a, 12b, 12c, e.g., a container or table, or the primary resource 20 may maintain references to its secondary resources 22a, 22b, 22c, and secondary resources 22a, 22b, 22c may maintain references to a lower level of secondary resources in a hierarchy.

Although in FIGS. 1 and 2 a certain number of instances of elements are shown, there may be any number of applications, resource groups, services, etc.

Figure 3:
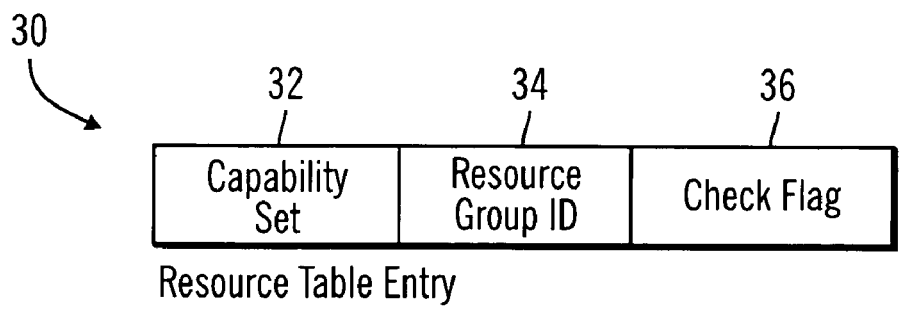
FIG. 3 illustrates an embodiment of a resource table entry providing information on a resource group.

FIG. 3 illustrates an embodiment of a resource table 14 entry 30 having a capability set 32 providing one or more capabilities, a resource group identifier (ID) 34 identifying the resource group 12a, 12b, 12c to which the capability set 32 applies, and a check flag 36 indicating whether the resource group 12a, 12b, 12c was recently returned to an application 6a, 6b, 6c. Each capability provides information on a resource (primary or secondary) for a service 8a, 8b, 8c, such as an identifier, function, descriptor, feature, etc. In one embodiment, the capability set 32 includes at least one capability for each resource (primary 20 and secondary 22a, 22b, 22c) in the identified resource group 34. In this way, all the resources for one service 8a, 8b, 8c are indexed and identified in the cache 10 according to the capabilities of those resources. The capabilities may be determined by processing information within the resource itself or from information provided by an external source, such as a table providing information on the capabilities for available resources.

In one embodiment, the applications 6a, 6b, 6c may share the resources of one resource group 12a, 12b, 12c to access the same service 8a, 8b, 8c. In such case, the cache 10 may maintain a locking mechanism to ensure that only one application 6a, 6b, 6c has access at a time to a resource group 12a, 12b, 12c to access the service 8a, 8b, 8c. Alternatively, applications 6a, 6b, 6c may maintain separate resource groups 12a, 12b, 12c in the cache 10 to access a same service to allow concurrent access to that service 8a, 8b, 8c.

In one embodiment, a cache class provides interfaces called by the applications 6a, 6b, 6c to perform operations with respect to the cache 10, such as adding primary 20 or secondary 22a, 22, 22c resources to the cache 10, querying for resources, etc.

Figure 4:
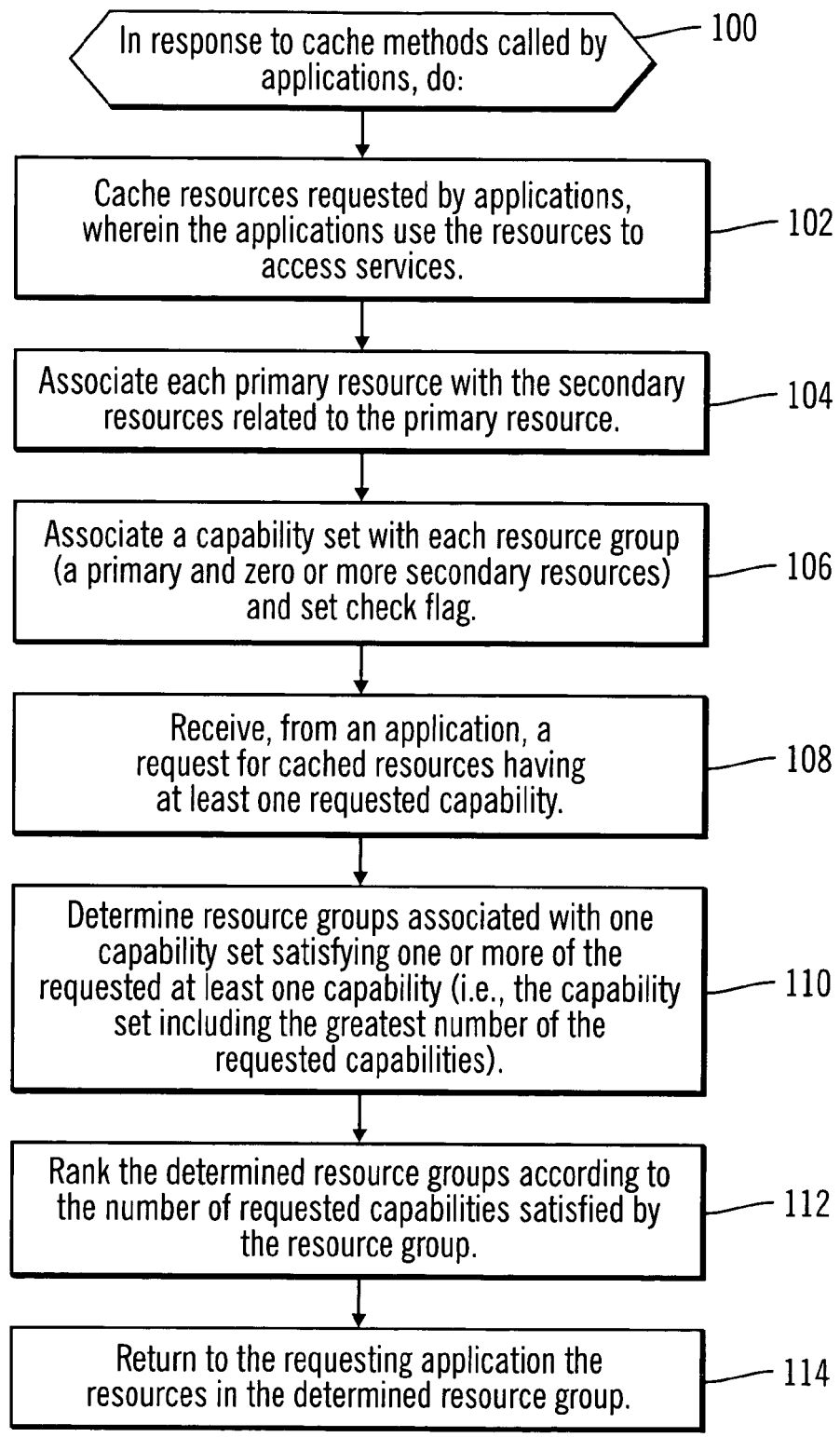
FIG. 4 illustrates an embodiment of operations to maintain resource groups in a cache.

FIG. 4 illustrates operations performed in response to methods of the cache class called (at block 100) by the applications 6a, 6b, 6c. At block 102, the applications 6a, 6b, 6c cache resources in the cache 10 that will be used to access the services 8a, 8b, 8c. In one embodiment, the applications 6a, 6b, 6c may call a method to initialize the cache 10 to initialize resources in the cache, such as the primary resources 20 for the resource groups 12a, 12b, 12c of services 8a, 8b, 8c that will be accessed. The applications 6a, 6b, 6c may instantiate the secondary resources 22a, 22b, 22c as they are needed. The cache 10 methods may further maintain an association (at block 104) of each primary resource 20 with the secondary resources 22a, 22b, 22c related to the primary resource 20. The cache 10 methods called by the applications 6a, 6b, 6c may further associate (at block 106) a capability set 32 with each resource group 12a, 12b, 12c through the use of the resource table 14 and entries 30 and sets the check flag 36, indicating whether the resources of the resource group 12a, 12b, 12c were returned to an application 6a, 6b, 6c.

The applications 6a, 6b, 6c may issue a query or request for resources satisfying at least one capability. For instance, the request may specify the capabilities of the primary resource 20 and one or more secondary resources 22a, 22b, 22c the application 6a, 6b, 6c needs. In response to the call (at block 108) from one application 6a, 6b, 6c for a request for cached resources having at least one requested capability, the called cache method 10 implementing such request determines (at block 110) the resource groups 12a, 12b, 12c associated with one capability set 32 in one table entry 30 (FIG. 3) satisfying one or more of the requested at least one capability. The capability set 32 satisfying the requested at least one capability may comprise the capability set 32 having the greatest number of the requested capabilities. The determined resource groups 12a, 12b, 12c are then ranked (at block 112) according to the number of requested capabilities satisfied by the resource group. The called cache method for resource requests then returns (at block 114) to the requesting application 6a, 6b, 6c the resources (primary 20 and secondary 22a, 22b, 22c) in the determined resource group 12a, 12b, 12c, i.e., the resource group 34 in the resource table entry 30 of the determined capability set 32 satisfying the requested capabilities. In an alternative embodiment, the cache method for resource requests may return a list of resources in the determined resource group 34 instead of the actual resources. The application 6a, 6b, 6c would then call a cache method requesting the specified desired listed resource from the returned resource group list.

In an additional embodiment, the resource table entry 30 may include a weighted value for each capability in the capability set 32. In such case, the operation at block 110 to determine a resource group having a capability satisfying the requested at least one capability may calculate a value for each resource group that is the sum of the weights of the capabilities in the capability set 32 that match the requested capabilities. A resource group having no matching capabilities may have a value of zero. The resource group having the greatest value, calculated as the sum of the weighted values of its capabilities that match the requested capabilities, is selected as the determined resource group to return to the requesting application 6a, 6b, 6c. Secondary resources that are more expensive to instantiate or known to be more frequently accessed may be assigned a relatively higher weight value, so that the resource group having resources deemed to have a greater value are more likely to be returned to the application over resource groups having lesser valued resources.

Figure 5:
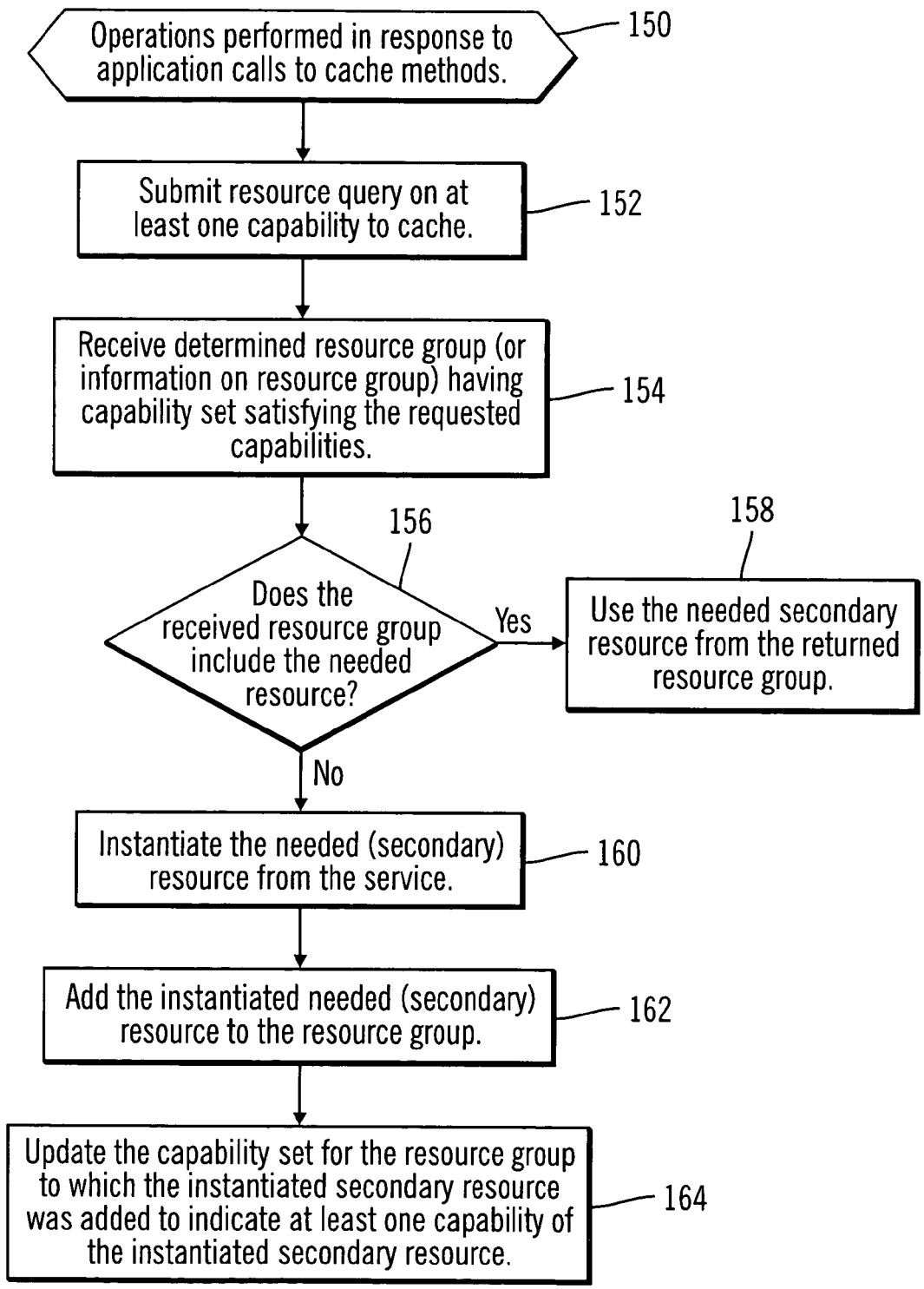
FIG. 5 illustrates an embodiment of operations to access resources from the cache.

FIG. 5 illustrates an embodiment of operations performed (at block 150) in response to cache methods called by the applications 6a, 6b, 6c to access service resources. At block 152, one application 6a, 6b, 6c calls a cache method to submit a resource query on at least one capability to the cache 10 and receives (at block 154) the determined resource group 34 (FIG. 3) having a capability set 32 satisfying the requested capabilities. If (at block 156) the received resource group includes the needed resource, primary 20 or secondary 22a, 22b, 22c, then the application 6a, 6b, 6c uses (at block 158) the needed resource from the returned resource group 12a, 12b, 12c. If the returned resource group 12a, 12b, 12c does not include the needed resource or no resource group is returned, then the application 6a, 6b, 6c calls methods of the service 8a, 8b, 8c to instantiate (at block 160) the needed (secondary) resource from the service 8a, 8b, 8c. The application 6a, 6b, 6c then calls cache methods to add (at block 162) the instantiated secondary resource to the resource group 12a, 12b, 12c to be available for subsequent access. As part of adding a new resource, primary 20 or secondary 22a, 22b, 22c, the capability set 32 for the resource group 34 to which the instantiated resource was added is updated (at block 164) to indicate at least one capability of the instantiated resource.

Figure 6:
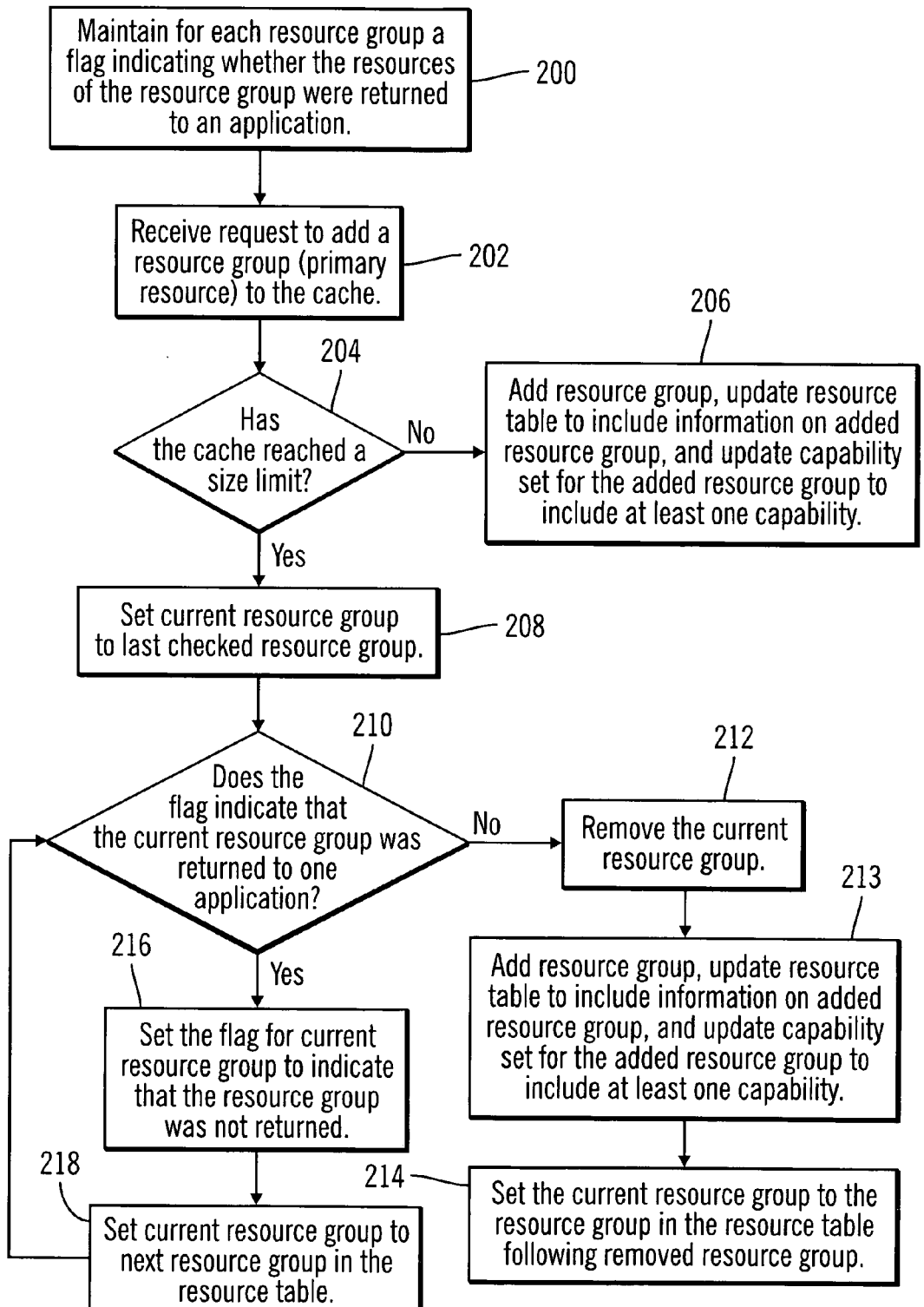
FIG. 6 illustrates an embodiment of operations to maintain a cache size limit.

FIG. 6 illustrates operations performed in response to cache methods called by the applications 6a, 6b, 6c to remove resource groups 12a, 12b, 12c from the cache 10 to maintain a cache 10 size limit. As part of cache operations, a flag 36 (FIG. 3) is maintained (at block 200) for each resource group 12a, 12b, 12c, which may be in the resource table entry 30 for the resource group, indicating whether the resources of the resource group 12a, 12b, 12c were returned to an application 6a, 6b, 6c. In response (at block 202) to receiving a cache method request to add a primary 20 or secondary 22a, 22b, 22c resource to the cache 10, a determination is made (at block 204) of whether the cache 10 has reached a cache size limit, i.e., whether adding the new resource would cause the size limit to be exceeded. If not, then the cache method adds (at block 206) the resource group, updates the resource table 14 to include information on the added resource group, and updates the capability set 32 for the added resource group to include at least one capability. If the added resource is a primary resource 20, then an entry 30 is added to the resource table 14 including the identifier for the added resource group 34 and the capabilities of the primary resource 30. If the added resource is a secondary resource for a preexisting resource group 12a, 12b, 12c, then the preexisting entry 30 in the resource table 14 for the updated resource group 34 is updated to add the at least one capability of the added secondary resource 22a, 22b, 22c to the capability set 32 for the resource group 34.

If (at block 204) the cache 10 size limit has been reached, then the cache methods set (at block 208) a current resource group to the last checked resource group 12a, 12b, 12c. If (at block 210) the flag 36 for the current resource group indicates that the current resource group was not returned to one application 6a, 6b, 6c, then that current resource group 12a, 12b, 12c is removed (at block 212) from the cache 10. The cache method then adds (at block 213) the resource group, updates the resource table 14 to include information on the added resource group, and updates the capability set 32 for the added resource group to include at least one capability. The current resource group pointer is set (at block 214) to the resource group 12a, 12b, 12c in the resource table following the removed resource group 12a, 12b, 12c At block 214, the removal operations may end after removing one resource group or control may proceed to block 210 to select an additional resource group to remove. Otherwise, if (at block 210) the flag 36 for the current resource group indicates that the resource group was not returned, then the cache method sets (at block 216) the flag 36 for the current resource group to indicate that the resource group 34 was not returned. The current resource group is set (at block 218) to the next resource group in the resource table 14 and control returns to block 210 to consider whether this next resource group should be removed. In this way, when the cache method is called to add resources to the cache 10, the operations of FIG. 6 are performed to determine one or more resource groups to remove that are indicated to not have been returned to one application or that were previously considered for removal, but not removed.

In alternative embodiments, different algorithms may be used to determine the resource groups to remove from cache, such as a Least Recently Used (LRU) algorithm, randomly select resources to remove, etc.

Described embodiments provide cache methods called by an application to maintain resources for different services 8a, 8b, 8c used by different applications 6a, 6b, 6c in a shared cache 10. Further, the resources are indexed and accessed in cache based on capabilities of the resources, e.g., attributes, functions, identifiers, etc., of the resources. In this way, the applications 6a, 6b, 6c can query the cache 10 based on the capabilities of the resources that are needed.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The computer readable medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In described embodiments, the operations related to the cache 10 are performed by methods of a cache lass called by the applications 6a, 6b, 6c. In an alternative embodiment, the operations may be implement in application code that is not in the form of methods of a cache class.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or that a different number of devices may be used than the multiple number shown.

The functionality and/or the features of a device may be alternatively embodied by one or more other devices which are not explicitly described as having such functionality/features. Thus, other embodiments of the present invention need not include the device itself.

The illustrated operations of FIGS. 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
    caching resources requested by applications in a cache, wherein the applications use the resources to access services;
    associating a capability set of at least one capability with each resource group, wherein a resource group includes at least one resource for accessing one service and wherein the capability set associated with one resource group indicates at least one capability for the resources in the resource group;
    providing a resource table indicating for each resource group in the cache the capability set for the resource group and a check flag indicating whether the resource group was recently returned to one of the applications, wherein the resources are indexed in the cache according to the capabilities of the resources in the cache;
    receiving, from one of the applications, a request for cached resources having a requested at least one capability;
    determining the one resource group associated with one capability set satisfying the requested at least one capability to return to the application requesting the service; and
    processing the check flags of the resource groups indicated in the resource table to determine which resource group to remove from the cache.

2. The method of claim 1, further comprising:
    returning to the requesting application the resources in the determined resource group.

3. The method of claim 1, wherein the capability sets for the resource groups include at least one capability for each resource in the resource group.

4. The method of claim 1, wherein a value is indicated for each capability of the resources in the resource groups, wherein determining the one resource group associated with one capability set satisfying the requested at least one capability comprises:
    determining a resource group value for each resource group by summing the values for the capabilities for the resources in the capability set for the resource group that match one requested capability, wherein the determined resource group satisfying the requested at least one capability comprises the resource grouping having the greatest resource group value.

5. The method of claim 1, wherein at least one resource group includes a primary resource used to access a service and at least one secondary resource providing a resource related to the service accessed through the primary resource, further comprising:
    providing an association of each primary resource and the secondary resources for the service accessed through the primary resource.

6. The method of claim 5, further comprising:
    determining, by the application, whether the determined resource group includes a needed secondary resource;
    instantiating, by the application, the needed secondary resource in response to determining that the cache does not include the needed secondary resource; and
    adding the created needed secondary resource to the determined resource group in the cache.

7. The method of claim 6, further comprising:
    updating the capability set for the resource group to which the instantiated secondary resource was added to indicate at least one capability of the instantiated secondary resource.

8. The method of claim 1, wherein the primary resources comprise at least one of connection objects representing connection channels to at least one system, session objects associated with messages and used to consume messages, and destination objects enabling access to a provider of services.

9. The method of claim 1, further comprising:
    determining whether the cache has reached a size limit, wherein the processing of the check flags to determine which resource group to remove from the cache is performed in response to determining that the number of resources in one resource group has reached the limit.

10. The method of claim 1, wherein determining the capability set associated with one resource group that satisfies the requested at least one capability comprises determining one capability set including a greatest number of the requested at least one capability.

11. A system, comprising:
    a processor;
    applications;
    a computer readable device implementing a cache for caching resources requested by the applications, wherein the applications use the resources to access services;
    a storage having code executed by the processor to perform operations, the operations comprising:
        associating a capability set of at least one capability with each resource group, wherein a resource group includes at least one resource for accessing one service and wherein the capability set associated with one resource group indicates at least one capability for the resources in the resource group;

providing a resource table indicating for each resource group in the cache the capability set for the resource group and a check flag indicating whether the resource group was recently returned to one of the applications, wherein the resources are indexed in the cache according to the capabilities of the resources in the cache;

receiving, from one of the applications, a request for cached resources having a requested at least one capability;

determining the one resource group associated with one capability set satisfying the requested at least one capability to return to the application requesting the service; and processing the check flags of the resource groups indicated in the resource table to determine which resource group to remove from the cache.

12. The system of claim 11, wherein a value is indicated for each capability in the capability sets for the resource groups, wherein determining the one resource group associated with one capability set satisfying the requested at least one capability comprises:

determining a resource group value for each resource group by summing the values for the capabilities in the capability set for the resource group that match one requested capability, wherein the determined resource group satisfying the requested at least one capability comprises the resource grouping having the greatest resource group value.

13. The system of claim 11, wherein at least one resource group includes a primary resource used to access a service and at least one secondary resource providing a resource related to the service accessed through the primary resource, wherein the operations further comprise:

providing an association of each primary resource and the secondary resources for the service accessed through the primary resource.

14. The system of claim 13, wherein the operations further comprise:

determining, by the application, whether the determined resource group includes a needed secondary resource;

instantiating, by the application, the needed secondary resource in response to determining that the cache does not include the needed secondary resource; and adding the created needed secondary resource to the determined resource group in the cache.

15. The system of claim 14, wherein the operations further comprise:

updating the capability set for the resource group to which the instantiated secondary resource was added to indicate at least one capability of the instantiated secondary resource.

16. The system of claim 11, wherein the primary resources comprise at least one of connection objects representing connection channels to at least one system, session objects associated with messages and used to consume messages, and destination objects enabling access to a provider of services.

17. The system of claim 11, wherein determining the capability set associated with one resource group that satisfies the requested at least one capability comprises determining one capability set including a greatest number of the requested at least one capability.

18. An article of manufacture comprising a computer readable storage medium including code executed to communicate with applications and a cache, wherein the code causes operations to be performed, the operations comprising:

caching resources requested by applications, wherein the applications use the resources to access services;

associating a capability set of at least one capability with each resource group, wherein a resource group includes at least one resource for accessing one service and wherein the capability set associated with one resource group indicates at least one capability for the resources in the resource group;

providing a resource table indicating for each resource group in the cache the capability set for the resource group and a check flag indicating whether the resource group was recently returned to one of the applications, wherein the resources are indexed in the cache according to the capabilities of the resources in the cache;

receiving, from one of the applications, a request for cached resources having a requested at least one capability;

determining the one resource group associated with one capability set satisfying the requested at least one capability to return to the application requesting the service; and processing the check flags of the resource groups indicated in the resource table to determine which resource group to remove from the cache.

19. The article of manufacture of claim 18, wherein the operations further comprise:

returning to the requesting application the resources in the determined resource group.

20. The article of manufacture of claim 18, wherein the capability sets for the resource groups include at least one capability for each resource in the resource group.

21. The article of manufacture of claim 18, wherein a value is indicated for each capability of the resources in the resource groups, wherein determining the one resource group associated with one capability set satisfying the requested at least one capability comprises:

determining a resource group value for each resource group by summing the values for the capabilities for the resources in the capability set for the resource group that match one requested capability, wherein the determined resource group satisfying the requested at least one capability comprises the resource grouping having the greatest resource group value.

22. The article of manufacture of claim 18, wherein at least one resource group includes a primary resource used to access a service and at least one secondary resource providing a resource related to the service accessed through the primary resource, further comprising:

providing an association of each primary resource and the secondary resources for the service accessed through the primary resource.

23. The article of manufacture of claim 22, wherein the application determines whether the determined resource group includes a needed secondary resource, and wherein the operations further comprise:

instantiating the needed secondary resource in response to the application determining that the cache does not include the needed secondary resource; and adding the created needed secondary resource to the determined resource group in the cache.

24. The article of manufacture of claim 23, wherein the operations further comprise:

updating the capability set for the resource group to which the instantiated secondary resource was added to indicate at least one capability of the instantiated secondary resource.

25. The article of manufacture of claim 18, wherein the primary resources comprise at least one of connection objects representing connection channels to at least one system, session objects associated with messages and used to consume messages, and destination objects enabling access to a provider of services.

26. The article of manufacture of claim 18, wherein the operations further comprise:

determining whether the cache has reached a size limit, wherein the processing of the check flag to determine which resource group to remove from the cache is performed in response to determining that the number of resources in one resource group has reached the limit.

27. The article of manufacture of claim 18, wherein determining the capability set associated with one resource group that satisfies the requested at least one capability comprises determining one capability set including a greatest number of the requested at least one capability.

* * * * *